United States Patent
Torres et al.

(10) Patent No.: US 9,893,831 B2
(45) Date of Patent: Feb. 13, 2018

(54) CONGESTION CONTROL FOR SCRAMBLED CODED MULTIPLE ACCESS (SCMA)

(71) Applicant: Hughes Network Systems, LLC, Germantown, MD (US)

(72) Inventors: Robert Torres, New Market, MD (US); John Border, Middletown, MD (US); Jun Xu, Takoma Park, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 90 days.

(21) Appl. No.: 14/814,796

(22) Filed: Jul. 31, 2015

(65) Prior Publication Data

US 2017/0034736 A1    Feb. 2, 2017

(51) Int. Cl.
*H04J 13/00* (2011.01)
*H04W 24/00* (2009.01)
*H04W 28/02* (2009.01)
*H04W 28/08* (2009.01)

(52) U.S. Cl.
CPC ......... *H04J 13/0003* (2013.01); *H04W 24/00* (2013.01); *H04W 28/0284* (2013.01); *H04W 28/08* (2013.01)

(58) Field of Classification Search
CPC .............. H04J 13/0003; H04W 24/00; H04W 28/0284; H04W 28/08
See application file for complete search history.

(56) References Cited

U.S. PATENT DOCUMENTS

| 8,619,974 | B2 | 12/2013 | Fang et al. | |
|---|---|---|---|---|
| 8,683,292 | B2 | 3/2014 | Lee et al. | |
| 2009/0027229 | A1* | 1/2009 | Fortson | H04Q 9/00 340/870.07 |
| 2011/0081871 | A1* | 4/2011 | Molnar | H04L 1/0007 455/67.13 |
| 2011/0126067 | A1* | 5/2011 | Rezk | H04L 1/0046 714/748 |
| 2011/0255464 | A1* | 10/2011 | Roos | H04B 7/18528 370/319 |
| 2012/0195216 | A1* | 8/2012 | Wu | H04W 72/0486 370/252 |
| 2013/0028310 | A1* | 1/2013 | Chiang | 375/227 |
| 2013/0188672 | A1* | 7/2013 | Chiang | H04B 17/29 375/219 |

(Continued)

*Primary Examiner* — Ajay Cattungal
(74) *Attorney, Agent, or Firm* — Bejin Bieneman PLC

(57) ABSTRACT

A telecommunication system includes a gateway receiver having a processor and a data storage medium. The receiver is programmed to wirelessly communicate with a plurality of terminals, determine an error rate associated with communication with the plurality of terminals, determine an operating probability from the error rate, and transmit the operating probability to the plurality of terminals. A terminal includes a transmitter programmed to transmit signals to the gateway receiver in accordance with a number of transmitting slots. The terminal has a receiver programmed to receive signals transmitted from the gateway receiver, including an operating probability signal representing the operating probability. The terminal also includes processor programmed to select the number of transmitting slots based at least in part on the operating probability.

17 Claims, 3 Drawing Sheets

(56) References Cited

U.S. PATENT DOCUMENTS

2014/0079041 A1\* 3/2014 Lopez .................. H04B 7/0639
370/337
2015/0373372 A1\* 12/2015 He ........................ H04N 19/13
375/240.12

\* cited by examiner

CONGESTION CONTROL FOR SCRAMBLED CODED MULTIPLE ACCESS (SCMA)

BACKGROUND

Wireless communication protocols include Time Division Multiple Access (TDMA), Code Division Multiple Access (CDMA), and Scramble Code Multiple Access (SCMA). TDMA generally allows multiple terminals to communicate with a receiver at a particular frequency but at different times to avoid or minimize interference. CDMA generally allows multiple terminals to communicate with a receiver over a single channel using a spread-spectrum technique and coding scheme. SCMA involves allowing different terminals, sharing a bandwidth, to communicate with a receiver by using specific scrambling sequences.

DETAILED DESCRIPTION

Figure 1:
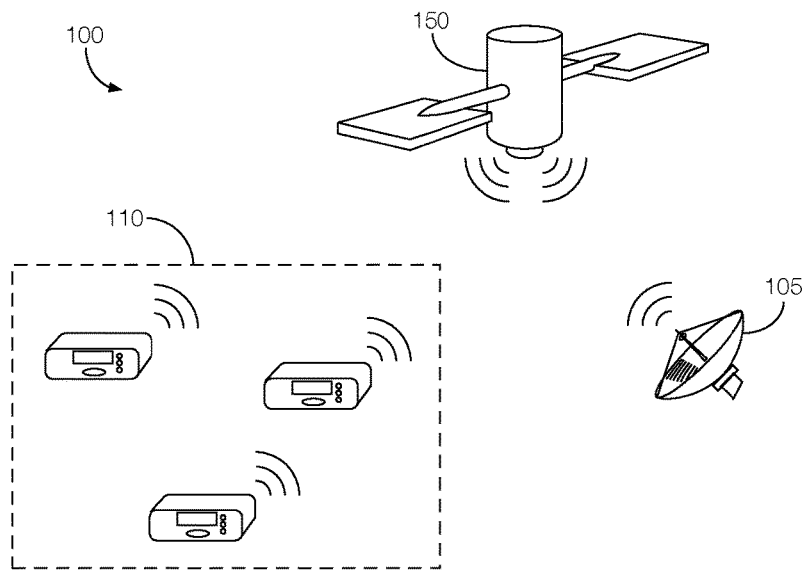
FIG. 1 illustrates an example telecommunication system with multiple transmitters and a gateway receiver.

With any communication system, the likelihood of interference increases as the number of devices communicating with a particular receiver increases. The problem is present in common multiple access schemes such as TDMA and CDMA. The SCMA scheme addresses such issues. Even telecommunication systems operating in accordance with SCMA, however, can be optimized.

An example of such a telecommunication system includes a gateway receiver having a processor and a data storage medium. The receiver is programmed to wirelessly communicate with a plurality of terminals, determine an error rate associated with communication with the plurality of terminals, determine an operating probability from the error rate, and transmit the operating probability to the plurality of terminals. An example terminal includes a transmitter programmed to transmit signals to the gateway receiver in accordance with a number of transmitting slots. The terminal has a receiver programmed to receive signals transmitted from the gateway receiver, including an operating probability signal representing the operating probability. The terminal also includes processor programmed to select the number of transmitting slots based at least in part on the operating probability. The gateway receiver and terminals work together to reduce interference among terminals communicating with the gateway receiver.

Accordingly, in one possible implementation, an operating probability is introduced. The operating probability is the probability that a terminal uses its SCMA transmission opportunities. At the gateway receiver, the SCMA burst error rate (BurstER) is measured. If the BurstER is high, the operating probability is reduced; otherwise, it is increased. The operating probability is broadcast to user terminals. A terminal may have certain amount of SCMA transmitting opportunities, referred to generally as SCMA Slots or Slots. The terminal applies the operating probability in determining the number of SCMA Slots. If the operating probability is high, the terminal uses more SCMA Slots; otherwise, it uses fewer Slots.

In another, or subsequent, approach, a shedding probability is introduced. The shedding probability is the probability that a terminal determines whether to transmit on an SCMA channel. If the operating probability is sufficiently low and the BurstER is still high, the shedding probability is increased; otherwise, it is decreased. The shedding probability is sent to terminals by the network. A terminal autonomously stops using the SCMA channel momentarily based on the shedding probability.

These schemes on the one hand, make the high priority traffic expedited by the SCMA channel, and on the other hand, enable the SCMA channel to work effectively at the desired burst error rate and throughput. While discussed generally in the context of SCMA communication, the gateway receiver and terminals may alternatively be implemented in other telecommunication schemes, including telecommunication schemes where multiple transactions can be received in the same time and frequency, where certain error rates may be subject to the current number of transactions received, or where input profiles are adjusted to maintain low latency and low packet loss performance.

While multiple access nodes can transmit at the same time on the same frequency, there is a limit as to how many access nodes can do so before the number of access node transmissions that can be successfully decoded drops below an acceptable rate. If a very large number of access nodes attempt to use the channel, the channel under this access method may undergo congestive collapse. This access method may be used for the sending of very high priority and latency sensitive control and data packets with attempts to maintain low packet drop and low latency characteristics for this traffic. Also, highly utilizing the channels maximizes the use of shared, expensive resources (e.g., frequency spectrum). Other time/frequency resources (e.g., TDMA bandwidth assignment) are sometimes better for lower priority packets as well as high priority packets if this access method is suffering congestion.

With multiple access schemes, it can be difficult to achieve high channel utilization while maintaining a low packet loss rate, achieve system stability that is robust in the presence of random arrivals, and allow the highest priority traffic to still utilize the channels with this access method while lower priority traffic is shed to other resources (e.g., TDMA) that are not suffering from overload.

The proposed access method addresses these issues by, e.g., locally measuring error rates at an individual access node to determine whether to shed data from or abandon this access method, receiving real-time network based measurements of the error rates of the entire system to determine whether an access node should shed data from or abandon this access method, receiving real-time network based measurements of the load of the entire system to determine whether to probabilistically desist from using this access method for some time period to alleviate offered load, changing the size and frequency at which an access node can burst onto the channel using this access method as a function of receiving error rate and load metrics, and having an access node to shed traffic from this access method as a function of protocol type, packet size, priority determinations, and other key criteria to attempt to retain optimal latency performance for the highest priority traffic.

The elements shown may take many different forms and include multiple and/or alternate components and facilities. The example components illustrated are not intended to be limiting. Indeed, additional or alternative components and/or implementations may be used.

As illustrated in FIG. 1, the telecommunication system 100 includes a gateway receiver 105 and multiple terminals (i.e., transmitters) 110 in communication with the gateway receiver 105. The telecommunication system 100 may implement any telecommunication protocol where multiple communications can be received in the same time and frequency, where a certain error rate may be subject to the current number of communications received, and where adjusting the input profile can maintain the low latency and packet loss profile. An example of such a telecommunication protocol may include the scrambled coded multiple access (SCMA) protocol.

Figure 2:
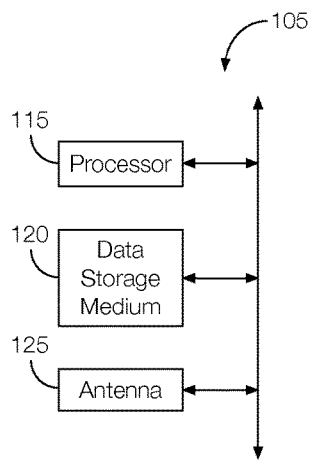
FIG. 2 is a block diagram of components in an example receiver.

With reference to FIGS. 1 and 2, the gateway receiver 105 may include any electronic device having at least one circuit, including a processor 115 and a data storage medium 120. The gateway receiver 105 may be configured or programmed to wirelessly communicate in accordance with a telecommunication protocol associated with the telecommunication system 100. For instance, the gateway receiver 105 may be incorporated into an SCMA telecommunication scheme. The processor 115 may include any computing device, which includes at least one circuit, configured or programmed to access and execute computer-executable instructions stored in the data storage medium 120. The gateway receiver 105 may be configured or programmed to wirelessly communicate with multiple terminals 110. Thus, the gateway receiver 105 may include an antenna 125 or other component used to receive wireless signals. The gateway receiver 105 may, in one possible implementation, communicate with the terminals 110 by way of a satellite 150 in, e.g., geosynchronous orbit with the Earth.

While communicating with multiple terminals 110, the gateway receiver 105 may be programmed to determine an error rate associated with the communication with the terminals 110. The error rate may include, e.g., an average error rate associated with the communication with the terminals 110. For instance, the error rate may be defined as a burst error rate.

The gateway receiver 105 may use the error rate to determine an operating probability. The operating probability may be defined as the probability that one of the terminals 110 uses a transmission opportunity. The transmission opportunity may be defined as a time interval in which the respective terminal 110 is permitted to communicate with the gateway receiver 105. The transmission opportunity may, therefore, be defined according to a timeframe such as a start time and a duration. The operating probability may be associated with the error rate. For instance, the operating probability may have an inverse relationship with the error rate. That is, a high operating probability may be associated with a low error rate and a low operating probability may be associated with a high error rate. After the operating probability is determined, the gateway receiver 105 may transmit the operating probability to the terminals 110.

The gateway receiver 105 may be further programmed to determine a shedding probability. The shedding probability may be defined as the probability that one of the terminals 110 will engage in wireless communication with the gateway receiver 105. Put another way, the shedding probability may consequently define the probability that one of the terminals 110 will communicate over a different telecommunications network such as a TDMA or CDMA network, which may occur if the operating probability is too low (i.e., the error rate is too high) for communications with the gateway receiver 105. Thus, a relatively high shedding probability may be associated with a low operating probability and a high error rate. Conversely, a relatively low shedding probability may be associated with a high operating probability and a low error rate. The gateway receiver 105 may be programmed to transmit the shedding probability to the terminals 110.

Figure 3:
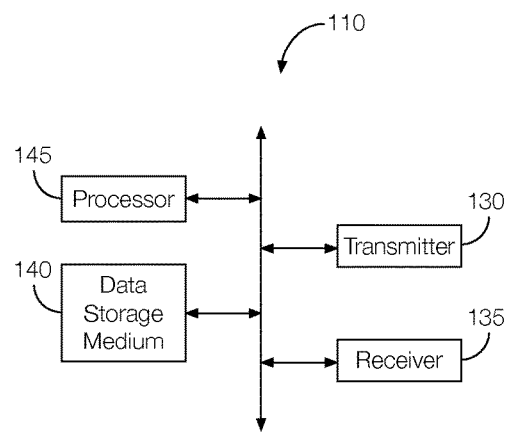
FIG. 3 is a block diagram of components in an example transmitter.

With reference to FIGS. 1 and 3, the terminals 110 may include any electronic device having at least one circuit configured or programmed to wirelessly communicate with the gateway receiver 105 in accordance with any number of telecommunications protocols. Moreover, the terminals 110 may be configured or programmed to communicate in accordance with other telecommunications protocols such as the TDMA or CDMA protocols. The terminals 110 may each include components such as a communication device, which may include a transmitter 130 and a receiver 135, a data storage medium 140, and a processor 145, among others. The transmitter 130 may be configured or programmed to transmit signals to the gateway receiver 105. The receiver 135 may be configured or programmed to receive signals transmitted from the gateway receiver 105 either directly or through an intermediary device such as a satellite 150. The data storage medium 140 may be programmed to store computer-executable instructions. The processor 145 may be programmed to access and execute the computer-executable instructions stored on the data storage medium 140.

In one possible implementation, the transmitter 130 may transmit signals to the gateway receiver 105 in accordance with multiple transmitting slots. The receiver 135 may receive signals transmitted by the gateway receiver 105, including an operating probability signal representing the operating probability and a shedding probability signal representing the shedding probability. The processor 145 may be programmed to select the number of transmitting slots based on the operating probability, the shedding probability, or both. For instance, the processor 145 may be programmed to compare the operating probability to a first threshold, a second threshold, or both, and modify the transmission behavior accordingly. In one possible implementation, the processor 145 may be programmed to modify the transmission behavior by, e.g., increasing the number of transmitting slots if the operating probability is above the first threshold and decreasing the number of transmitting slots if the operating probability is below the second threshold. If the operating probability is between the first and second thresholds, the processor 145 may be programmed to keep the number of transmission slots the same.

Similarly, the processor 145 may be programmed to compare the shedding probability to a predetermined threshold. The processor 145 may be programmed to permit the terminal 110 to engage in wireless communication with the gateway receiver 105 in accordance with, e.g., the SCMA scheme if the shedding probability is below the predetermined threshold. If the shedding probability exceeds the predetermined threshold, the processor 145 may be programmed to cease communication with the gateway receiver 105 and wirelessly communicate in accordance with a different protocol such as TDMA or CDMA. Thus, the terminal 110, and by extension the communication device 130, 135, is programmed to selectively communicate with the gateway receiver 105 in accordance with the SCMA communication protocol.

Figure 4:
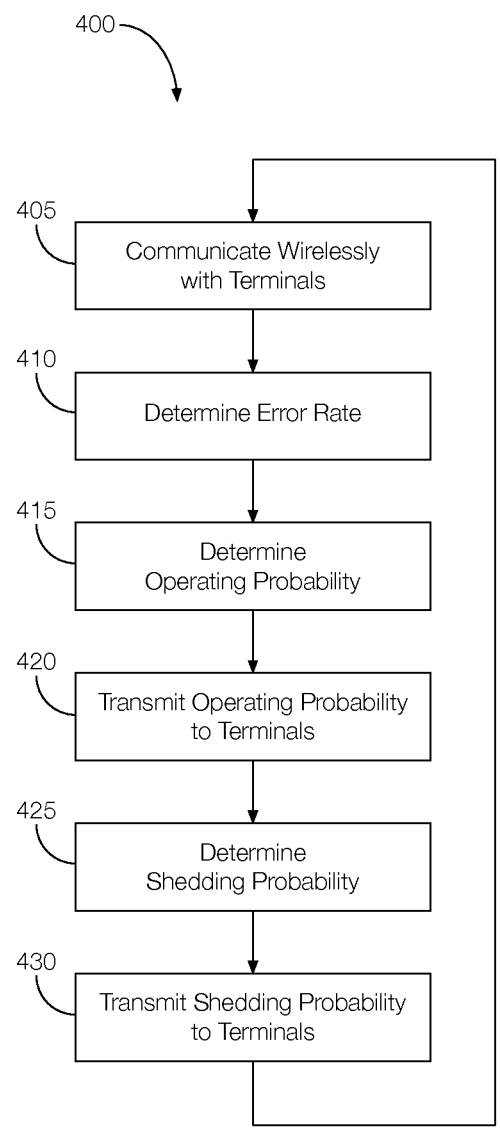
FIG. 4 is a flowchart of an example process that may be executed by components of the receiver.

FIG. 4 is a flowchart of an example process 400 that may be implemented by one or more components of the gateway receiver 105 shown in FIGS. 1 and 2.

At block 405, the gateway receiver 105 may begin wireless communication with multiple terminals 110. The gateway receiver 105 may communicate with the terminals 110 through a telecommunication protocol such as SCMA or any other communication protocol where multiple communications can be received in the same time and frequency, where a certain error rate may be subject to the current number of communications received, and where adjusting the input profile can maintain the low latency and packet loss profile.

At block 410, the gateway receiver 105 may determine an error rate associated with the wireless communication with the terminals 110. The error rate may include an average error rate associated with the communication with the terminals 110. In one possible approach, the error rate includes a burst error rate.

At block 415, the gateway receiver 105 may determine an operating probability. The operating probability may be based on the error rate. For instance, a relatively high operating probability may be based on a relatively low error rate, and a relatively low operating probability may be based on a relatively high error rate.

At block 420, the gateway receiver 105 may transmit the operating probability to the terminals 110. That is, the gateway receiver 105 may be programmed to generate and transmit the operating probability signal, representing the operating probability determined at block 415, to the terminals 110.

At block 425, the gateway receiver 105 may determine the shedding probability. The shedding probability may be based on the error rate, the operating probability, or both. For instance, a relatively high shedding probability may be associated with a low operating probability and a high error rate. Likewise, a relatively low shedding probability may be associated with a high operating probability and a low error rate.

At block 430, the gateway receiver 105 may transmit the shedding probability to the terminals 110. The gateway receiver 105 may generate the shedding probability signal representing the shedding probability determined at block 425 and transmit the shedding probability signal to the terminals 110.

The process 400 may end after block 430 or return to block 405.

Figure 5:
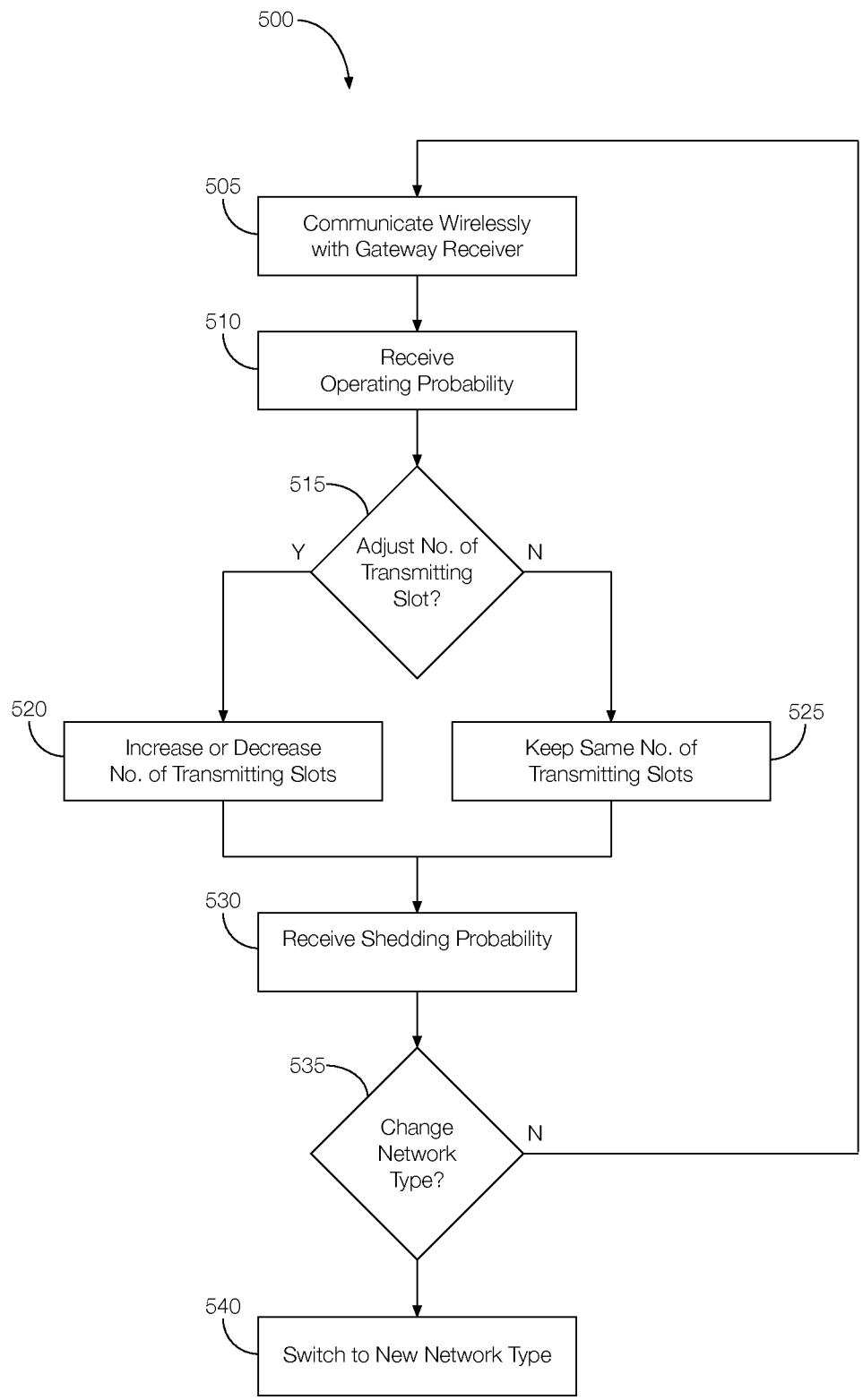
FIG. 5 is a flowchart of an example process that may be executed by components of the transmitter.

FIG. 5 is a flowchart of an example process 500 that may be implemented by one or more components of each terminal 110 shown in FIGS. 1 and 3.

At block 505, the terminal 110 may wirelessly communicate with the gateway receiver 105. The communication with the gateway receiver 105 may be through a telecommunication protocol such as SCMA or any other communication protocol where multiple communications can be received in the same time and frequency, where a certain error rate may be subject to the current number of communications received, and where adjusting the input profile can maintain the low latency and packet loss profile.

At block 510, the terminal 110 may receive the operating probability signal. The receiver at the terminal 110 may receive the operating probability signal, which may be transmitted from the gateway receiver 105.

At decision block 515, the terminal 110, namely the processor 145 at the terminal 110, may compare the operating probability represented by the operating probability signal to a first threshold, a second threshold, or both, to determine whether to adjust the number of transmitting slots. If the operating probability is above the first threshold or below the second threshold, the process 500 may proceed to block 520. If the operating probability is between the first and second thresholds, the process 500 may proceed to block 525.

At block 520, the terminal 110, namely the processor 145 at the terminal 110, may adjust the number of transmitting slots. On the one hand, if the operating probability is above the first threshold, the processor 145 may increase the number of transmitting slots since. Increasing the number of transmitting slots may permit the terminal 110 to communicate more often with the gateway receiver 105, and since the operating probability is relatively high (i.e., above the first threshold), the error rate when communicating with the gateway receiver 105 may be presumed to be relatively low. On the other hand, the processor 145 at the terminal 110 may decrease the number of transmitting slots if the operating probability is below the second threshold. Decreasing the number of transmitting slots may reduce the number of communications between the terminal 110 and the gateway receiver 105 over a period of time since a low operating probability (i.e., below the second threshold) suggests a high error rate.

At block 525, the terminal 110, namely the processor 145 at the terminal 110, may keep the number of transmitting slots relatively constant. The operating probability between the first and second thresholds suggests that the terminal 110 is communicating with the gateway receiver 105 with a sufficiently low error rate, and that the number of times the terminal 110 communicates with the gateway receiver 105 over a particular period of time should remain relatively constant since increasing the number of communicates may increase the error rate and decreasing the number of communications may reduce efficiency of the telecommunication system 100.

At block 530, the terminal 110 may receive the shedding probability signal. The shedding probability signal may be received via the receiver at the terminal 110. The shedding probability may represent, e.g., the shedding probability determined by the gateway receiver 105.

At decision block 535, the terminal 110, namely the processor 145 at the terminal 110, may compare the shedding probability to a predetermined threshold to determine whether to switch to a different type of network. If the shedding probability exceeds the predetermined threshold, the process 500 may proceed to block 540. If the shedding probability does not exceed the predetermined threshold, the process 500 may return to block 505, thereby permitting the communication with the gateway receiver 105 in accordance with the SCMA communication scheme.

At block 540, the terminal 110 may cease communicating with the gateway receiver 105. For instance, the processor 145 of the terminal 110 may determine that the shedding probability exceeding the predetermined threshold indicates a high error rate and thus low operating probability. The processor 145 may be programmed to determine that it would be more efficient to communicate in accordance with a different communication protocol such as TDMA or CDMA. The process 500 may end after block 540.

Accordingly, the proposed telecommunication system 100 can locally measure error rates at an individual access node (i.e., terminal 110) to determine whether to shed data from or abandon this access method, receive real-time network based measurements of the error rates of the entire system to determine whether a terminal 110 should shed data from or abandon this access method, receive real-time network based measurements of the load of the entire system to determine whether to probabilistically desist from using this access method for some time period to alleviate offered load, change the size and frequency at which an access node can burst onto the channel using this access method as a function of receiving error rate and load metrics, and have a terminal 110 shed traffic from this access method as a function of protocol type, packet size, priority determinations, and other key criteria to attempt to retain optimal latency performance for the highest priority traffic.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a network device, a set top box, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A receiver comprising a processing circuit and a data storage medium,
wherein the processing circuit is programmed to wirelessly communicate with a plurality of transmitters, determine an error rate associated with communication with the plurality of transmitters, determine an operating probability from the error rate, and transmit the operating probability to the plurality of transmitters,
wherein the error rate is an average error rate based on communication with the plurality of transmitters, and
wherein the processing circuit is further programmed to command, by transmitting the operating probability to the plurality of transmitters, at least one of the plurality of transmitters to increase a number of transmitting slots as a result of the at least one of the plurality of transmitters determining that the operating probability is above a first threshold and to decrease the number of transmitting slots as a result of the at least one of the plurality of transmitters determining that the operating probability is below a second threshold.

2. The receiver of claim 1, wherein a high operating probability is associated with a low error rate and a low operating probability is associated with a high error rate.

3. The receiver of claim 1, wherein the plurality of transmitters are programmed to communicate over multiple telecommunications networks and wherein the processing circuit is programmed to determine a shedding probability that includes a probability that one of the plurality of transmitters will engage in wireless communication with the receiver.

4. The receiver of claim 3, wherein the processing circuit is programmed to transmit the shedding probability to the plurality of transmitters.

5. The receiver of claim 3, wherein a high shedding probability is associated with a low operating probability and a high error rate.

6. The receiver of claim 5, wherein a low shedding probability is associated with a high operating probability and a low error rate.

7. The receiver of claim 1, wherein the error rate is a burst error rate.

8. A method comprising:
wirelessly communicating with a plurality of transmitters;
determining an average error rate associated with communication with the plurality of transmitters;
determining an operating probability from the error rate; and
transmitting the operating probability to the plurality of transmitters to command at least one of the plurality of transmitters to increase a number of transmitting slots as a result of determining that the operating probability is above a first threshold and to decrease the number of transmitting slots as a result of determining that the operating probability is below a second threshold.

9. The method of claim 8, wherein a high operating probability is associated with a low error rate and a low operating probability is associated with a high error rate.

10. The method of claim 8, wherein the plurality of transmitters are programmed to communicate over multiple telecommunications networks, the method further comprising determining a shedding probability that includes a probability that one of the plurality of transmitters will engage in wireless communication.

11. The method of claim 10, further comprising transmitting the shedding probability to the plurality of transmitters.

12. The method of claim 10, wherein a high shedding probability is associated with a low operating probability and a high error rate and wherein a low shedding probability is associated with a high operating probability and a low error rate.

13. A transmitter comprising:
a communication device programmed to transmit signals to a receiver in accordance with a number of transmitting slots and receive signals transmitted from the receiver, the signals including an operating probability signal representing an operating probability; and
a processing circuit programmed to modify transmission behavior based at least in part on the operating probability, wherein modifying the transmission behavior includes increasing the number of transmitting slots as a result of determining that the operating probability is above a first threshold and decreasing the number of transmitting slots as a result of determining that the operating probability is below a second threshold.

14. The transmitter of claim 13, wherein the communication device is further configured to communicate over multiple telecommunications networks and programmed to receive a shedding probability signal representing a shedding probability, wherein the shedding probability includes a probability that the transmitter will continue to engage in wireless communication with the receiver.

15. The transmitter of claim 14, wherein a high shedding probability is associated with a low operating probability and a high error rate and wherein a low shedding probability is associated with a high operating probability and a low error rate.

16. The transmitter of claim 14, wherein the processing circuit is programmed to compare the shedding probability to a predetermined threshold and engage in wireless communication with the receiver if the shedding probability is below the predetermined threshold.

17. The transmitter of claim 13, wherein the communication device is programmed to selectively communicate with the receiver in accordance with a Scrambled Coded Multiple Access (SCMA) communication protocol.

* * * * *